3,007,932
Patented Nov. 7, 1961

3,007,932
PROCESS FOR THE PREPARATION OF
14-HYDROXYCODEINE
Ulrich Weiss, Jamaica, N.Y., assignor to Mozes Judas Lewenstein, Kew Gardens, N.Y.
No Drawing. Filed June 29, 1956, Ser. No. 594,694
2 Claims. (Cl. 260—285)

This invention relates to a new codeine derivative and it has particular relation to 14-hydroxycodeine and to a process for preparing the same.

It has been found that 14-hydroxycodeine can be obtained with favorable yield by subjecting 14-hydroxycodeinone to the action of a borohydride in the manner described hereinafter. The structural Formula I of 14-hydroxycodeine as well as the Formula II of 14-hydroxycodeinone are shown as follows:

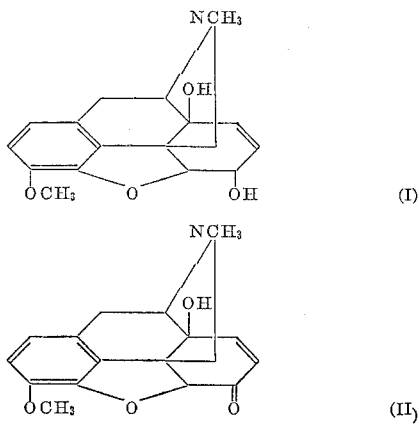

According to the present invention, 14-hydroxycodeine is prepared by reduction of 14-hydroxycodeinone with a borohydride in ethanol. The smooth reaction gives 14-hydroxycodeine in high yields. After recrystallization, e.g., from boiling hexane, beautiful crystals of 14-hydroxycodeine are obtained with a constant melting point of 157.5°–158.5° C. Instead of ethanol, other appropriate solvents (e.g. methanol, other alcohols, pyridine, etc.) can also be used.

*Example*

5 g. of sodium borohydride are suspended in 400 ml. of 95% ethanol and to this suspension 5 g. of 14-hydroxycodeinone suspended in 50 ml. of 95% ethanol are added in small portions during a period of about 2 hours at room temperature. Thereby the remarkably ethanol-insoluble 14-hydroxycodeinone disappears quite rapidly and a fluocculent precipitate forms gradually. The reaction mixture is allowed to stand at room temperature for about 24 hours. It is then concentrated under reduced pressure to about ½ of its volume and an equal volume of 10% aqueous sodium hydroxide is then added. The mixture is rapidly brought to ebullition and the resulting clear liquid is cooled in ice water. The base is extracted with several portions of chloroform, the combined extracts are washed with a small volume of water, dried with anhydrous sodium sulfate and evaporated completely under reduced pressure. The oily residue slowly solidifies to a mass of beautiful clear crystals. The yield amounts to 4.5 g.

Recrystallization from about 250 volumes of boiling hexane, with the addition of charcoal, gives colorless crystals of pure 14-hydroxycodiene having a constant melting point of 157.5–158.5° C.

*Analysis*

| | Percent |
|---|---|
| C | 68.80, 68.50 |
| H | 6.61, 6.35 |

The amounts calculated for the formula $C_{18}H_{21}O_4N$ are 68.55% of C and 6.71% of H.

The new base of the present invention can be converted into salts in conventional manner with acids, as examples of which therapeutically applicable acids such as hydrochloric acid, hydrobromic acid, hydroiodic acid, sulfuric acid, orthophosphoric acid, citric acid, tartaric acid, acetic acid, and salicylic acid are mentioned.

The new compound of the invention and its therapeutically applicable salts can be used as analgesic compounds and narcotic agents. They have favorable analgesic and narcotic properties and reduced side effects.

What is claimed is:

1. A process for preparing 14-hydroxycodeine comprising the reduction of 14-hydroxycodeinone suspended in a liquid reaction medium by means of a borohydride.
2. A process as claimed in claim 1, in which sodium borohydride is used.

References Cited in the file of this patent
UNITED STATES PATENTS
2,778,832    Gates _____ Jan. 22, 1957

OTHER REFERENCES
Bentley: The Chemistry of the Morphine Alkaloids, Oxford, Clarendon Press, 1954, pp. 252–253 and 260.